2,861,053
POLYOLEFIN COMPOSITIONS CONTAINING CERTAIN 2-HYDROXY-4-ALKOXY BENZOPHENONES

Gerald R. Lappin and John W. Tamblyn, Kingsport, Tenn., assignors to Eastman Kodak Company, Rochester, N. Y., a corporation of New Jersey No Drawing. Application November 7, 1957
Serial No. 694,906

12 Claims. (Cl. 260—45.95)

This invention relates to polyolefin plastic compositions stabilized against deterioration by the action of ultraviolet light.

In recent years, polyethylene plastics have come to be widely used. They have properties which make them very useful for many purposes, but they are subject to deterioration by weathering, due at least in part to the action of ultraviolet light. Compounds which are useful as ultraviolet inhibitors in cellulose ester compositions or in vinyl resin compositions have not, as a rule, proved to be effective in polyethylene compositions, either because of exudation, discoloration on exposure, or for some other reason.

We have discovered that 2-hydroxy-4-dodecyloxy benzophenone,

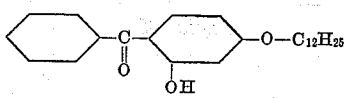

and 2-hydroxy-4-tetradecyloxy benzophenone are compatible with various types of polyethylene and with polypropylene, and give excellent stabilization of these plastics against the deteriorating effects of ultraviolet light, without discoloration or exudation.

2-hydroxy-4-alkoxy benzophenones in which the alkoxy group contains 10 or less carbon atoms, or 16 or more carbon atoms, were found to be incompatible with polyethylene, exuding when used in amounts of only 1 part of the 2-hydroxy-4-alkoxy benzophenone per 100 parts of polyethylene. It was therefore very surprising to find that 2-hydroxy-4-dodecyloxy benzophenone and 2-hydroxy-4-tetradecyloxy benzophenone are compatible with polyolefins. It may be assumed that 2-hydroxy-4-tridecyloxy benzophenone is also compatible and operative as a stabilizer.

We have prepared 2-hydroxy-4-dodecyloxy-benzophenone and 2-hydroxy-4-tetradecyloxy benzophenone in the following manner.

PREPARATION OF 2-HYDROXY-4-DODECYLOXY-BENZOPHENONE

A mixture of 100 g. (0.40 mole) of 1-bromododecane, 85 g. (0.40 mole) of 2,4-dihydroxybenzophenone, 80 g. of potassium carbonate, and 500 ml. of acetone was refluxed with stirring for 24 hours. The reaction mixture was poured into 2 l. of water and cooled to 10° C., and the product was separated by filtration. Recrystallization from ethanol gave 102 g. of pale yellow crystals, with a melting point of 43–44° C. The yield was 67% of theoretical. Analysis: Calculated for $C_{25}H_{34}O_3$: C, 78.5%; H, 8.9%. Found: C, 78.5%; H, 8.93%.

PREPARATION OF 2-HYDROXY-4-TETRADECYLOXY BENZOPHENONE 2-hydroxy-4-tetradecyloxy benzophenone was prepared in a manner analogous to the preparation of 2-hydroxy-4-dodecyloxy benzophenone, by reacting 25 g. (0.09 mole) of 1-bromotetradecane with 19.5 g. (0.09 mole) of 2,4-dihydroxybenzophenone. 29 g. of pale yellow crystals was obtained, melting at 38–39° C. The yield was 78.5% of theoretical. Analysis: Calculated for $C_{27}H_{38}O_3$: C, 79.02%; H, 9.27%. Found: C, 79.16%; H, 9.28%.

In testing the stabilizing effect of our novel stabilizers, we have proceeded as follows.

*Example 1.*—One part by weight of 2-hydroxy-4-dodecyloxy benzophenone was mixed into 100 parts by weight of polyethylene of melt index 2 (A. S. T. M. D1238–52T) on hot compounding rolls, the front roll being held at 270° F. and the rear roll at 220° F. After 4 minutes' rolling the rolled slab was pressed at 285° F. into sheets of 0.060 inch thickness. These sheets were subjected to outdoor exposure. The development of carbonyl groups on exposure was measured by difference, before and after exposure, in infrared absorption in the 5.82µ region. The results listed in Table I show clearly the effectiveness of 2-hydroxy-4-dodecyloxy benzophenone in suppressing the undesirable photo-oxidation.

*Example 2.*—A second series of polyethylene compositions, prepared and sheeted in a similar manner, were subjected to outdoor exposure. The amount of 2-hydroxy-4-dodecyloxy benzophenone was again 1 part to 100 parts of polyethylene. The polyethylene also had a melt index of 2. Table II shows the results.

*Example 3.*—The compositions of Example 1 were compression-molded into sheets ⅛ inch in thickness. Rectangles 1.5 inch x 0.5 inch were cut from these sheets, bent into U-shape in aluminum channels and exposed outdoors in this stressed condition, with the stressed side toward the light. Ten samples of each composition were mounted in this way. Observations were made every few days for the onset of cracking in the stressed region of the specimens. In Table III the number of days' exposure required to produce cracks in 5 of the 10 specimens is recorded as the stress-cracking resistance.

Table I

| Stabilizer | Carbonyl formation (arbitrary units) after exposure of— | | | Exudation | Color | |
|---|---|---|---|---|---|---|
| | 131 days | 1 year | 18 months | | Before exposure | After exposure |
| None | 56 | (¹) | (¹) | None | None | None. |
| 4-dodecyloxy-2-hydroxy-benzophenone. | 4 | 4 | 9 | ---do--- | ---do--- | Do. |

¹ Too high to measure.

Table II

| Stabilizer | Carbonyl formation (arbitrary units) after exposure of— | | Exudation | Color | |
|---|---|---|---|---|---|
| | 31 days | 69 days | | Before exposure | After exposure |
| None | 7 | 17 | None | None | None. |
| 4-dodecyloxy-2-hydroxy-benzophenone. | 0.0 | 0.0 | ---do--- | ---do--- | Do. |

Table III

| Stabilizer | Stress-cracking resistance (exposure time in days required to crack half the samples) | Exudation |
| --- | --- | --- |
| None | 170 | None. |
| 4-dodecyloxy-2-hydroxy-benzophenone | >699 | Do. |

*Example 4.*—The 0.060-inch sheets described in Example 1 were examined for tensile properties after 14.5 months' exposure. The percent elongation was measured by means of the Instron Tensile Tester. The results of these tests are shown in Table 4. It will be observed that the elongation of the unstabilized polyethylene falls off very rapidly on exposure compared with the tensile strength, which usually is hardly affected until the elongation has nearly all been lost.

*Example 5.*—The compositions described in Example 1 were pressed to sheets 0.005 inch thick, and exposed in an Atlas Twin-Arc Weather-Ometer, modified by the addition of fluorescent sun lamps as described in Analytical Chemistry, 25, 460 (1953), except that twelve Westinghouse 20-watt fluorescent sun lamps were used instead of eight. The progress of weathering damage was followed by tensile elongation measurements as in Example 4. The development of brittleness was also observed by noting the exposure time required to cause the films to break when creased once with the exposed surface on the outside of the crease. Table V gives the results of these tests.

*Example 6.*—Samples of a second set of polyethylene films, prepared like those of Example 5, from the compositions of Example 1, were also exposed in the modified Weather-Ometer. Table VI summarizes the measurements of elongation decay and of embrittlement on these films.

*Example 7.*—Samples of the film of Example 5 were exposed outdoors for six months. Table VII shows the results.

*Example 8.*—Films of 0.001–0.002 inch thickness were extruded from the compositions described in Example 1, and were exposed in the modified Weather-Ometer. Deterioration in these thin films took place somewhat more rapidly than in the thicker films described in Example 5. The results of tensile elongation measurements and development of brittleness are shown in Table VIII.

Table IV

| Stabilizer | Percent original elongation retained after 14.5 months' exposure | Percent original tensile strength retained after 14.5 months' exposure | Exudation |
| --- | --- | --- | --- |
| None | 10 | 90 | None. |
| 4-dodecyloxy-2-hydroxybenzophenone | 111 | 105 | Do. |

Table V

| Stabilizer | Percent original elongation retained after exposure of— | | Exposure required for development of brittleness (hr.) |
| --- | --- | --- | --- |
| | 500 hr. | 1,000 hr. | |
| None | 15 | 0 | 800 |
| 4-dodecyloxy-2-hydroxy-benzophenone | 80 | 70 | 2,600 |

Table VI

| Stabilizer | Percent original elongation retained after exposure of— | | Exposure required for development of brittleness (hr.) |
| --- | --- | --- | --- |
| | 400 hr. | 800 hr. | |
| None | 11 | 0 | 800 |
| 4-dodecyloxy-2-hydroxy-benzophenone | 108 | 85 | 2,500 |

Table VII

| Stabilizer | Percent original elongation retained after 6 months' outdoor exposure |
| --- | --- |
| None | 46 |
| 4-dodecyloxy-2-hydroxybenzophenone | 82 |

Table VIII

| Stabilizer | Percent original elongation retained after exposure of 400 hr. | Exposure required for development of brittleness (hr.) |
| --- | --- | --- |
| None | 0 | 600 |
| 4-dodecyloxy-2-hydroxybenzophenone | 60 | >1,000 |

Table IX

| Stabilizer | Percent original elongation retained after— | |
| --- | --- | --- |
| | 470 hr. exposure | 1150 hr. exposure |
| None | 20 | 0 |
| 4-dodecyloxy-2-hydroxybenzophenone | 85 | 70 |

*Example 9.*—A high-melting, crystallizable polyethylene having a density of 0.945 was compounded on hot rolls with 2-hydroxy-4-dodecyloxy benzophenone in the proportions of 1 part of stabilizer per 100 parts of polyethylene. The composition was compression-molded to films of 0.005 inch thickness, which were cut into samples 2½ x ½ inch in size. These films were exposed in an Atlas Twin-Arc Weather-Ometer modified as described in Example 5 except that ten Westinghouse 20-watt fluorescent sun lamps were used instead of twelve. The progress of weathering damage was followed by elongation measurements by means of an Instron Tensile Tester, using a rate of stretch of 100% per minute. All films were conditioned for 3 days at 73° F. and 50% R. H. before testing. Table IX gives the results.

*Example 10.*—Additional samples of the films described in Example 9 were also exposed in the same modified Weather-Ometer. Elongation measurements were made at a rate of stretch of 2000% per minute. The results are shown in Table X.

*Example 11.*—The polyethylene compositions of Example 9 were formed into sheets ⅟₁₆ inch thick, and exposed outdoors for 5 months. Infrared absorption of the sheets at 5.8μ was measured before and after exposure to give a measure of carbonyl formation by photo-oxidation during exposure. The difference was expressed in arbitrary units and recorded in Table XI.

*Example 12.*—Sheets as described in Example 11 were cut into sets of 10 samples, 1½ x ½ inch in size. These were bent into a U-shape and held in this position in aluminum channels during exposure, as in Example 3. The stressed portion of each sample was mounted facing the light, and the samples were exposed outdoors. The exposure times, in days, required to crack the first sample, half of the samples (i. e., five samples) and all (ten) samples are listed in Table XII.

Table X

| Stabilizer | Percent original elongation retained after 410 hr. exposure |
| --- | --- |
| None | 12 |
| 4-dodecyloxy-2-hydroxybenzophenone | 80 |

Table XI

| Stabilizer | Carbonyl formation (arbitrary units) |
| --- | --- |
| None | 55 |
| 4-dodecyloxy-2-hydroxybenzophenone | 4 |

Table XII

| Stabilizer | Stress-cracking resistance exposure time (days) required to crack | | |
| --- | --- | --- | --- |
| | 1 sample | 5 samples | 10 samples |
| None | 160 | 170 | 330 |
| 4-dodecyloxy-2-hydroxybenzophenone | >535 | >535 | >535 |

*Example 13.* — 2-hydroxy-4-dodecyloxybenzophenone was extrusion-compounded into polypropylene of melt index 0.08 and ash content of 0.43%. Temperatures of 475° F. to 500° F. were reached by the plastic mixtures in the vicinity of the extrusion die. The plastic composition was extruded in the form of a strip 0.020 inch thick, which was cut into 2½ x ½ inch specimens for testing.

Weathering exposures were made in an Atlas Twin-Arc Weather-Ometer, modified by the addition of ten Westinghouse 20-watt fluorescent sun lamps, as described in Example 9. Weathering damage in the exposed test strips was assessed from time to time during exposure in the following ways:

(a) Measurement of flexural strength by the Tour-Marshall test for stiffness in flexure (A. S. T. M. D747–43).

(b) Measurement of inherent viscosity of tetralin solutions, 0.25 g. polymer per 100 cc. solvent, at 145° C. The inherent viscosity is defined as $$\frac{\ln \eta r}{0.25}$$

where $\eta r$ is the ratio of viscosity of solution to viscosity of solvent. The polypropylene used had an inherent viscosity of 2.77.

(c) Formation of cracks or breaks when creased with the exposed side on the outside of the crease.

The results are shown in Table XIII.

*Example 14.*—When a composition containing 100 parts by weight of polyethylene of melt index 2 and one part by weight of 2-hydroxy-4-tetradecyloxybenzophenone was pressed into sheets of 0.060 inch thickness and the sheets tested as in Example 1, the carbonyl formation was 9 units at the end of 131 days, 10 units at the end of 1 year, and 20 units at the end of 18 months. There was no color and no exudation either at the beginning of the test or at the end of 18 months.

When samples of the same sheeting were tested as in Example 4, the percentage of original elongation retained after 14.5 months' exposure was 127, and the percentage of original tensile strength retained after 14.5 months' exposure was 120. There was no exudation.

While in our examples we have shown the use of 1% of 2-hydroxy-4-dodecyloxybenzophenone or 2-hydroxy-4-tetradecyloxybenzophenone, based on the weight of polyolefin, it will be understood that somewhat less or considerably more of the stabilizer may be used, for example, from 0.5% to 10%.

Table XIII.—*Ultraviolet stabilization of polypropylene*

| Stabilizer | Concn. of stabilizer (percent by wt.) | Percent initial flexural strength left after 450 hours' exposure | Percent initial inherent viscosity left after 95 hours' exposure | Exposure time required to crack on crease (hr.) | Exposure time required to break on crease (hr.) |
| --- | --- | --- | --- | --- | --- |
| None | | 0 | 23 | 75 | 150 |
| 4-dodecyloxy-2-hydroxybenzophenone | 1 | 95 | 90 | 200 | 700 |

What we claim as our invention and desire to be secured by Letters Patent of the United States is:

1. A polyolefin plastic composition comprising a polyolefin selected from the group consisting of polyethylene and polypropylene, and, as an agent for inhibiting deterioration of the plastic by ultraviolet light, a 2-hydroxy-4-alkoxybenzophenone in which the alkoxy group contains from 12 to 14 carbon atoms.

2. A polyolefin plastic composition comprising a polyolefin selected from the group consisting of polyethylene and polypropylene, and, as an agent for inhibiting deterioration of the plastic by ultraviolet light, a compound selected from the group consisting of 2-hydroxy-4-dodecyloxybenzophenone and 2-hydroxy-4-tetradecyloxy benzophenone.

3. A polyolefin plastic composition comprising a polyolefin selected from the group consisting of polyethylene and polypropylene, and, as an agent for inhibiting deterioration of the plastic by ultraviolet light, 2-hydroxy-4-dodecyloxy-benzophenone.

4. A polyolefin plastic composition comprising a polyolefin selected from the group consisting of polyethylene and polypropylene, and, as an agent for inhibiting deterioration of the plastic by ultraviolet light, 2-hydroxy-4-tetradecyloxybenzophenone.

5. A polyolefin plastic composition comprising a polyolefin selected from the group consisting of polyethylene and polypropylene, and, as an agent for inhibiting deterioration of the plastic by ultraviolet light, approximately 0.5% to 10%, based on the weight of polyolefin, of 2-hydroxy-4-dodecyloxybenzophenone.

6. A polyethylene plastic composition comprising polyethylene and, as an agent for inhibiting deterioration of the plastic by ultraviolet light, approximately 0.5% to 10%, based on the weight of polyethylene, of 2-hydroxy-4-dodecyloxy benzophenone.

7. A polypropylene plastic composition comprising polypropylene and, as an agent for inhibiting deterioration of the plastic by ultraviolet light, approximately 0.5% to 10%, based on the weight of polypropylene, of 2-hydroxy-4-dodecyloxy benzophenone.

8. A polyolefin plastic composition comprising a polyolefin selected from the group consisting of polyethylene and polypropylene, and, as an agent for inhibiting deterioration of the plastic by ultraviolet light, approximately 0.5% to 10% based on the weight of polyolefin, of 2-hydroxy-4-tetradecyloxy benzophenone.

9. A polyolefin plastic composition comprising a polyolefin selected from the group consisting of polyethylene and polypropylene, and, as an agent for inhibiting deterioration of the plastic by ultraviolet light, approximately 1%, based on the weight of polyolefin, of 2-hydroxy-4-dodecyloxy benzophenone.

10. A polyethylene plastic composition comprising polyethylene and, as an agent for inhibiting deterioration of the plastic by ultraviolet light, approximately 1%, based on the weight of polyethylene, of 2-hydroxy-4-dodecyloxy benzophenone.

11. A polypropylene plastic composition comprising polypropylene and, as an agent for inhibiting deterioration of the plastic by ultraviolet light, approximately 1%, based on the weight of polypropylene, of 2-hydroxy-4-dodecyloxy benzophenone.

12. A polyethylene plastic composition comprising polyethylene and, as an agent for inhibiting deterioration of the plastic by ultraviolet light, approximately 1%, based on the weight of polyethylene, of 2-hydroxy-4-tetradecyloxy benzophenone.

No references cited.